US007216192B2

(12) United States Patent
Boulay et al.

(10) Patent No.: US 7,216,192 B2
(45) Date of Patent: May 8, 2007

(54) GUIDED CONFIGURATION OF DATA STORAGE SYSTEMS

(75) Inventors: Paul Robert Boulay, Campbell, CA (US); Michael Allan Brewer, Boulder, CO (US); Michael Lee Workman, Saratoga, CA (US)

(73) Assignee: Pillar Data Systems, Inc., San Jose, CA (US)

( * ) Notice: Subject to any disclaimer, the term of this patent is extended or adjusted under 35 U.S.C. 154(b) by 246 days.

(21) Appl. No.: 10/837,322

(22) Filed: Apr. 30, 2004

(65) Prior Publication Data

US 2005/0246479 A1 Nov. 3, 2005

(51) Int. Cl.
*G06F 13/00* (2006.01)
*H05K 7/10* (2006.01)

(52) U.S. Cl. .................. 710/302; 710/104; 710/301
(58) Field of Classification Search .............. 710/8–10, 710/74, 104, 300–302; 713/1, 100
See application file for complete search history.

(56) References Cited

U.S. PATENT DOCUMENTS

| | | | |
|---|---|---|---|
| 4,212,059 A | | 7/1980 | Sato et al. |
| 4,823,283 A | | 4/1989 | Diehm et al. |
| 4,918,693 A | | 4/1990 | Ardini, Jr. et al. |
| 5,448,675 A | * | 9/1995 | Leone et al. ............... 385/135 |
| 5,577,201 A | | 11/1996 | Chan et al. |
| 5,625,783 A | | 4/1997 | Ezekiel et al. |
| 5,692,140 A | | 11/1997 | Schmitt et al. |
| 5,890,204 A | | 3/1999 | Ofer et al. |
| 5,903,913 A | | 5/1999 | Ofer et al. |
| 5,960,451 A | | 9/1999 | Voigt et al. |

(Continued)

OTHER PUBLICATIONS

"Fibre Channel Tutorial". New Hampshire University InterOperability Lab. Online May 4, 1998. Retrieved from Internet Aug. 1, 2006. <http://web.archive.org/web/20020814053806/http://www.iol.unh.edu/training/fc/fc_tutorial.html>.*

(Continued)

*Primary Examiner*—Glenn A. Auve
*Assistant Examiner*—Thomas J. Cleary
(74) *Attorney, Agent, or Firm*—Robert Moll

(57) ABSTRACT

The present invention relates to systems and methods for configuring a data storage system. One method adds a Fibre Channel device to the loop by beaconing first and second ports, displaying instructions to connect a cable, receiving an indication the cable is connected, enabling the first port, initiating a LIP, and verifying whether the cable is connected. Another method removes a Fibre Channel device from the loop by beaconing the second port, bypassing the first port, initiating a LIP, beaconing the first port, displaying instructions for disconnecting the cable, and receiving an indication the cable is disconnected. A system includes means for displaying instructions to add a Fibre Channel device on the loop and a management controller for beaconing first and second ports, displaying instructions to connect a cable, receiving an indication that the cable is connected, enabling the first port, initiating a LIP, and verifying whether the cable is connected properly. Another system includes means for displaying instructions to remove a Fibre Channel device from the loop and a management controller programmed for beaconing the second port, bypassing the first port, initiating a LIP, beaconing the first port, displaying instructions to disconnect a cable, receiving an indication that the cable is disconnected, and verifying whether the cable is disconnected.

34 Claims, 10 Drawing Sheets

U.S. PATENT DOCUMENTS

| | | | |
|---|---|---|---|
| 6,058,454 | A | 5/2000 | Gerlach et al. |
| 6,279,125 | B1 | 8/2001 | Klein |
| 6,346,954 | B1 | 2/2002 | Chu et al. |
| 6,357,017 | B1 | 3/2002 | Bereiter et al. |
| 6,538,669 | B1 | 3/2003 | Lagueux, Jr. et al. |
| 6,809,505 | B2 * | 10/2004 | Peeke et al. .................. 324/66 |
| 2002/0019908 | A1 | 2/2002 | Reuter et al. |
| 2002/0087780 | A1 | 7/2002 | Selkirk et al. |
| 2003/0018756 | A1 * | 1/2003 | Nguyen et al. ............. 709/220 |
| 2003/0028826 | A1 | 2/2003 | Balluff |
| 2003/0079082 | A1 | 4/2003 | Sicola et al. |
| 2003/0079156 | A1 | 4/2003 | Sicola et al. |
| 2003/0146929 | A1 | 8/2003 | Baldwin et al. |
| 2004/0252650 | A1 * | 12/2004 | Vageline et al. ............ 370/254 |
| 2005/0135056 | A1 * | 6/2005 | Suzuki et al. ............... 361/685 |

OTHER PUBLICATIONS

"Fibre Channel Arbitrated Loop (FC-AL)". Revision 4.5. Working Draft Proposal. American National Standard for Information Technology. Jun. 1, 1995. pp. ii-x and 1-92.*

Martin, William R. "Fibre Channel SAN Ready Guidelines". V0.1. T11/99-306v0. Technical Committee T-11. Jun. 2, 1999.*

Reinhold, Barry. "Fibre Channel SAN Tolerant Guidelines". Draft 0.T11/99-352v0. Technical Committe T-11. Jun. 10, 1999.*

"Fibre Channel—Overview of the Technology". Fibre Channel Industry Association. pp. 1-9. Online Apr. 26, 2003. Retrieved from Internet Aug. 2, 2006. <http://web.archive.org/web/20030426142952/http://www.fibrechannel.org/technology/overview.html>.*

Heath, John R. et al. "High-Speed Storage Area Networks Using a Fibre Channel Arbitrated Loop Interconnect", IEEE Network. Mar./Apr. 2000. pp. 51-56. 0890-8044/00.*

Kembel and Truestedt, The Fibre Channel Consultant Series—Fibre Channel Arbitrated Loop (Copyright 1996, 1997, 1998, and 2000).

* cited by examiner

GUIDED CONFIGURATION OF DATA STORAGE SYSTEMS

BACKGROUND

The present invention relates to guided configuration of data storage systems.

This application incorporates herein by reference as follows:

U.S. application Ser. No. 10/264,603, Systems and Methods of Multiple Access Paths to Single Ported Storage Devices, filed on Oct. 3, 2002;

U.S. application Ser. No. 10/354,797, Methods and Systems of Host Caching, filed on Jan. 29, 2003, now U.S. Pat. No. 6,965,979 B2;

U.S. application Ser. No. 10/397,610, Methods and Systems for Management of System Metadata, filed on Mar. 26, 2003;

U.S. application Ser. No. 10/440,347, Methods and Systems of Cache Memory Management and Snapshot Operations, filed on May 16, 2003;

U.S. application Ser. No. 10/600,417, Systems and Methods of Data Migration in Snapshot Operations, filed on Jun. 19, 2003;

U.S. application Ser. No. 10/616,128, Snapshots of File Systems in Data Storage Systems, filed on Jul. 8, 2003, now U.S. Pat. No. 6,959,313 B2;

U.S. application Ser. No. 10/677,560, Systems and Methods of Multiple Access Paths to Single Ported Storage Devices, filed on Oct. 1, 2003; and U.S. application Ser. No. 10/696,327, Data Replication in Data Storage Systems, filed on Oct. 28, 2003.

A data storage system may include one or more hosts, management controllers, and data storage subsystems connected to each other using Ethernet or Fibre Channel (FC). FIG. 1 illustrates a data storage system 10 that includes a number of cables between the hosts 200 and 230, the management controllers 110 and 220, and the data storage subsystems 250 to 270. Each host may communicate with each data storage subsystem through a Fibre Channel arbitrated loop (Fibre Channel loop). Redundant Fibre Channel loops ensure multiple communication paths from a host to a data storage subsystem. The data storage subsystems 250, 252, 254, and 256 connect directly to the hosts 200 and 230, while data storage subsystems 260 and 270 are daisy chained to the data storage subsystems 250 and 252. Thus, misconnections at one data storage subsystem affect others.

The modular nature of a data storage system permits trained personnel to add and remove components to configure the data storage system to meet changing requirements. However, the cabling ports of the hosts and data storage subsystems are close to each other and users may insert cables in the wrong ports. Due to the number of connections, there are many opportunities for error. Although Fibre Channel cabling can be connected during operation, it must be done accurately and in the correct sequence to avoid disrupting data access. If configuring data storage systems could be made sufficiently easy and reliable, users could do it themselves when desired without the need for trained personnel.

SUMMARY OF THE INVENTION

The present invention relates to methods and systems of configuring a data storage system. One method adds a Fibre Channel device to a Fibre Channel loop by beaconing a first and second port, displaying instructions to connect a cable between the first and second ports, receiving an indication that the cable is connected, enabling the first port, initiating a loop initialization primitive (LIP) on the loop, and verifying whether the cable is connected between the first port and the second port.

Another method removes a Fibre Channel device from the loop by beaconing the second port, bypassing the first port, initiating a LIP on the loop, beaconing the first port, displaying instructions for disconnecting the cable between the first port and the second port, and receiving an-indication that the cable is disconnected.

One system includes means for displaying instructions to connect the second Fibre Channel device on the loop and a management controller programmed for beaconing the first and second ports, displaying instructions to connect a cable, receiving an indication that the cable is connected, enabling the first port, initiating a LIP, and verifying whether a cable is connected properly.

Another system includes means for displaying instructions to remove a Fibre Channel device from a Fibre Channel loop and a management controller programmed for beaconing a second port, bypassing a first port, initiating a LIP, beaconing the first port, displaying instructions to disconnect a cable, receiving an indication that the cable is disconnected, and verifying whether the cable is disconnected.

DETAILED DESCRIPTION OF THE PREFERRED EMBODIMENTS

The following description includes the best mode of carrying out the invention, illustrates the principles of the invention, and should not be taken in a limiting sense. The scope of the invention is determined by reference to the claims. Each part or step is assigned its own number in the specification and drawings.

Figure 2:
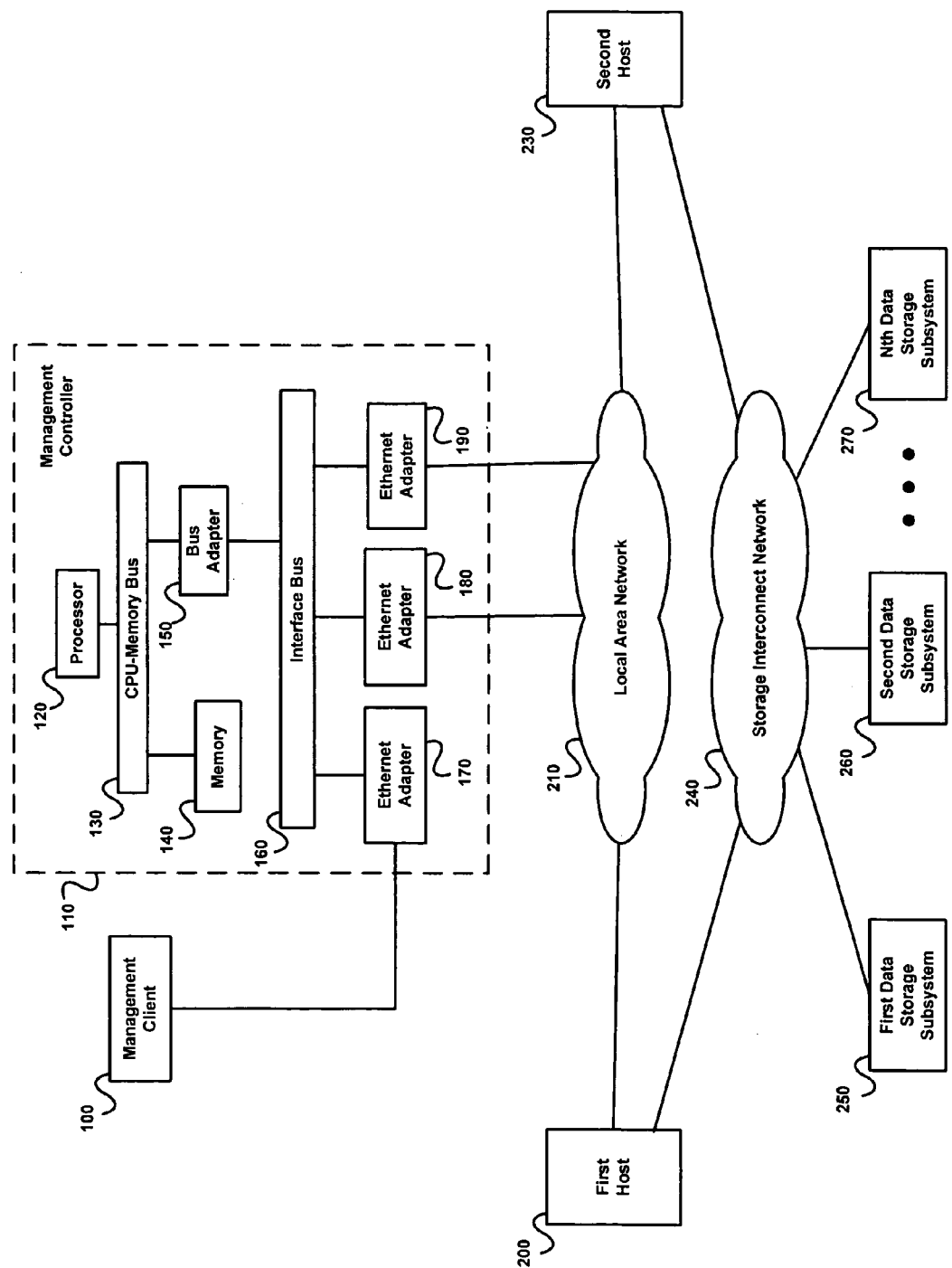
FIG. 2 illustrates a data storage system including hosts, a management controller, and data storage subsystems.

FIG. 2 illustrates a data storage system that includes a first host 200, a management controller 110, a second host 230, and first through Nth data storage subsystems 250, 260, and 270. Each host and management controller is a computer that can connect to client(s), data storage subsystem(s) and other hosts using software/hardware interfaces such as network interface cards and software drivers to implement Ethernet, Fibre Channel, ATM, SCSI, and/or InfiniBand. Hennessy and Patterson, *Computer Architecture: A Quantitative Approach* (2003), and Patterson and Hennessy, *Computer organization and Design: The Hardware/Software Interface* (1998) describe computer hardware and software, storage systems, caching, and networks and are incorporated herein by reference. Each host runs an operating system such as Linux, UNIX, a Microsoft OS, or another suitable operating system. Tanenbaum, *Modern Operating Systems* (2001) describes operating systems in detail and is incorporated herein by reference.

The management controller 110 guides the user in adding and removing Fibre Channel devices such as data storage subsystems 250, 260, and 270 and hosts 200 and 230. FIG. 2 shows the management controller 110 includes a motherboard with a CPU-memory bus 130 that communicates with a processor 120 and memory 140. The processor 120 employed is not essential to the invention and could be any suitable general-purpose processor such as the Intel Pentium 4, an ASIC dedicated to perform the operations described herein, or a field programmable gate array (FPGA). Each management controller 110 includes a bus adapter 150 between the CPU-memory bus 130 and an interface bus 160, which in turn interfaces with two or more Ethernet adapters 170, 180 and 190. The management controller 110 runs an operating system such as Linux, UNIX, a Microsoft OS or another suitable operating system. Tanenbaum, *Modern Operating Systems* (2001) describes operating systems in detail and is incorporated herein by reference.

The management controller 110 can communicate with the first and second hosts 200 and 230 through a local area network (LAN) 210. The first host 200 and second host 230 can communicate with each other and the first through Nth data storage subsystems 250, 260, and 270 through a storage interconnect network 240. The LAN 210 and the storage interconnect network 240 can be separate networks as illustrated or combined in a single network, and may be any suitable known bus, SAN, LAN, or WAN technology such as Fibre Channel, SCSI, InfiniBand, or Ethernet, and the type of interconnect is not essential to the invention. See Kembel, The FibreChannel Consultant, *A Comprehensive Introduction* (1998), Kembel, The FibreChannel Consultant, *Arbitrated Loop* (1996–1997) The FibreChannel Consultant, *Fibre Channel Switched Fabric* (2001), Clark, *Designing Storage Area Networks* (2003), Clark, *IP SANs: A Guide to iSCSI, iFCP, and FCIP Protocols for Storage Area Networks* (2002) and Clark, *Designing Storage Area Networks* (1999), which are incorporated herein by reference.

A management client 100 can communicate with the management controller 110 through the Ethernet adapter 170 or alternatively communicate through a suitable bus, SAN, LAN, or WAN technology such as Fibre Channel, SCSI, InfiniBand, or Ethernet, and the type of interconnect is not essential to the invention. In an alternative embodiment, the management client 100 is a display peripheral of the management controller 110.

Figure 3:
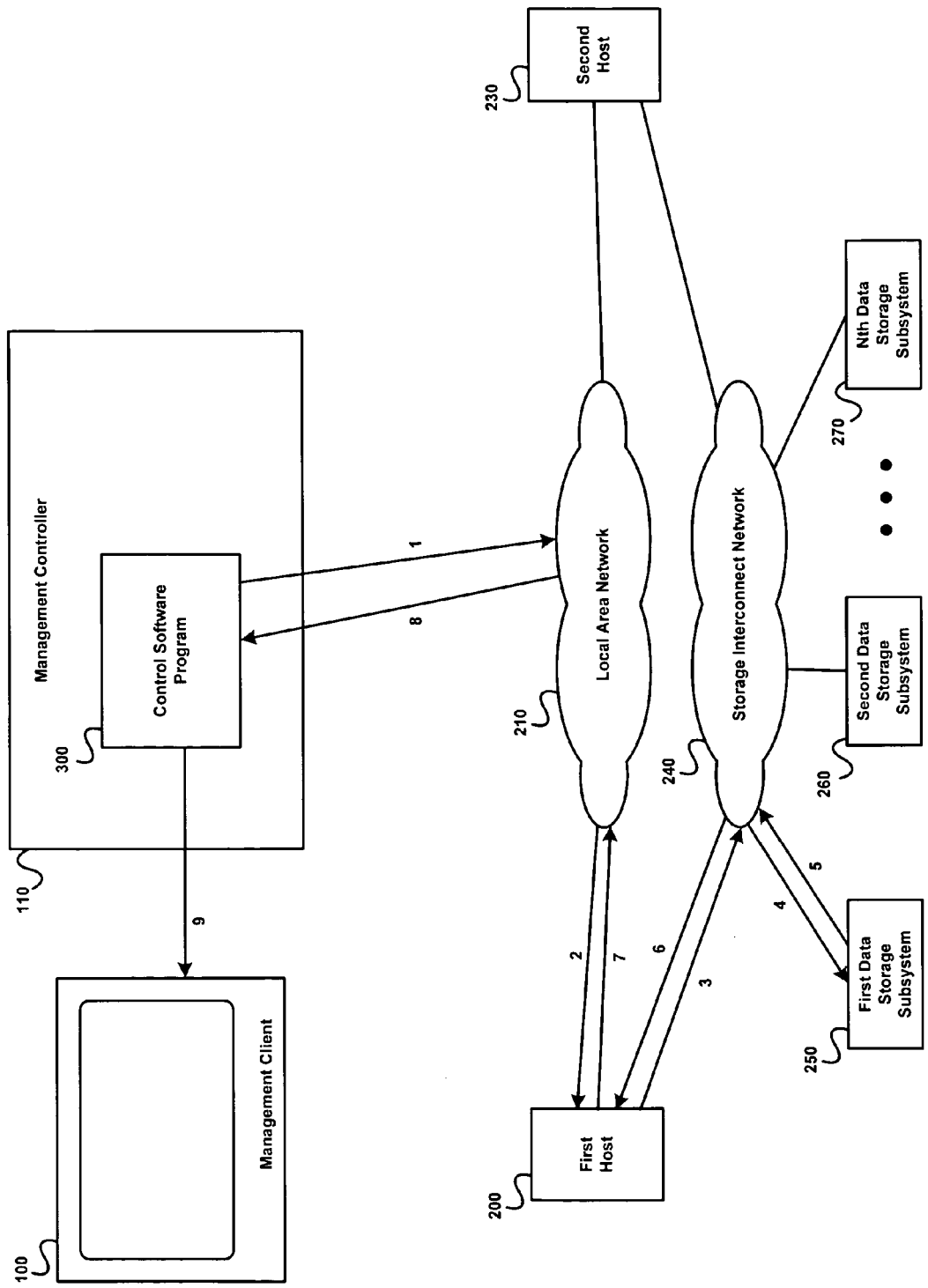
FIG. 3 illustrates an architecture for communication between a management controller, a management client, and a data storage system.

FIG. 3 illustrates an architecture for communication between a management controller 110, a management client 100, and a data storage system. To illustrate the architecture we describe an embodiment that enables communications to beacon a light corresponding to a port on a first data storage subsystem 250 (FIG. 4) and display instructions at the management client 100. At step 1, the control software program 300 executed in the management controller 110 sends a message using TCP/IP to the LAN 210. At step 2, the message transmits from the LAN 210 to the first host 200. The first host 200 translates the message into a Fibre Channel command and transmits the command to the storage interconnect network 240 at step 3. The storage interconnect network 240 passes the command to the first data storage subsystem 250 at step 4. In response, the first data storage subsystem 250 beacons a light corresponding to a port (i.e., beacons the port) on the data storage subsystem 250. At steps 5 and 6, the first data storage subsystem 250 transmits its acknowledgment of a successful beaconing command through the storage interconnect network 240 to the first host 200. At step 7, the first host 200 transmits the acknowledgment to the LAN 210. At step 8, the LAN 210 transmits the acknowledgment to the management controller 110. At step 9, the control software program 300 transmits instructions to the management client 100 to proceed to another step such as displaying instructions to the user.

FIGS. 4–7 illustrate how to connect a Fibre Channel cable from a first data storage subsystem 250 to a second data storage subsystem 260 without disrupting access to the data storage system.

Figure 4:
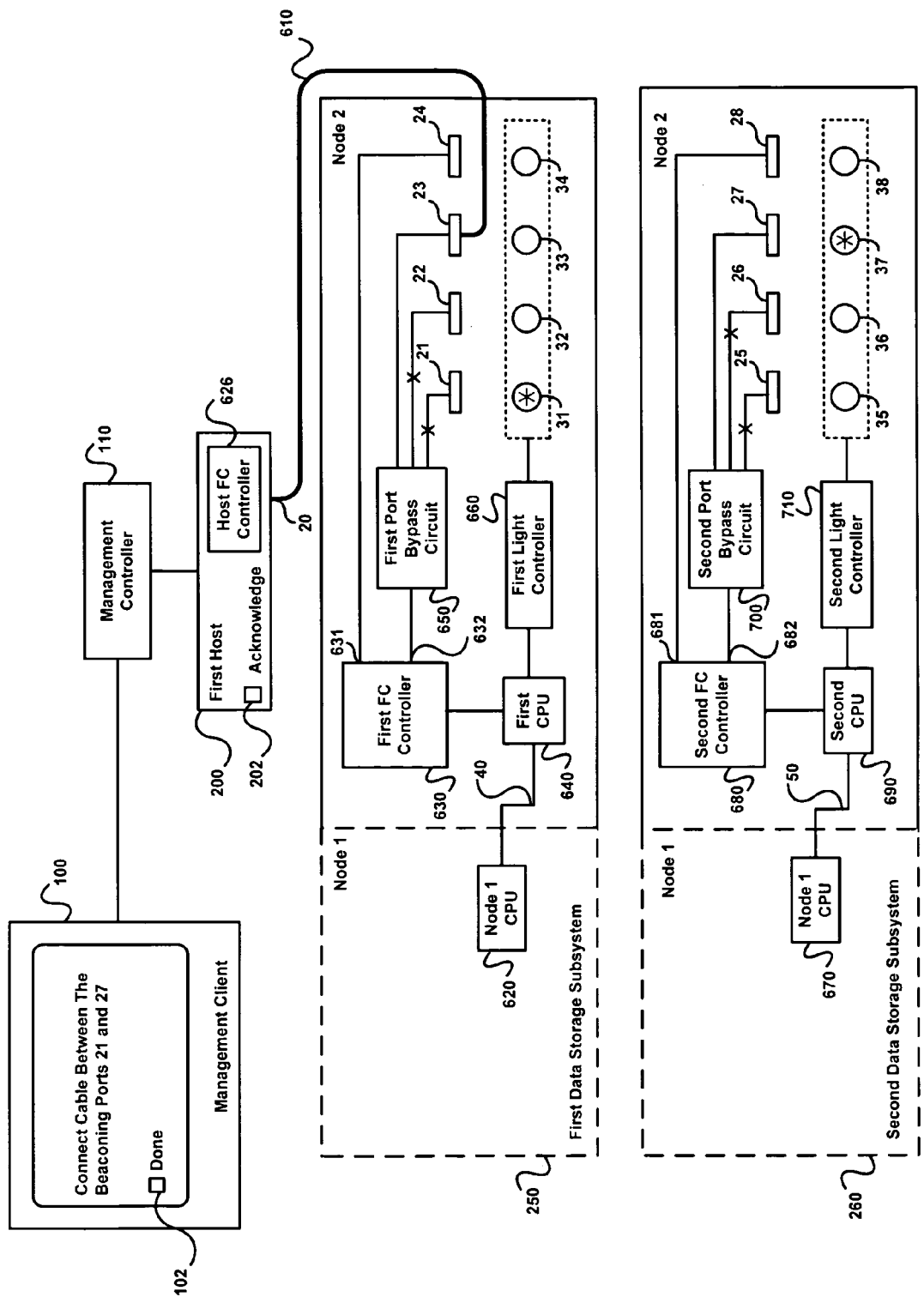
FIG. 4 illustrates the data storage subsystems before connecting cable between the beaconing ports.

FIG. 4 illustrates the first and second data storage subsystems 250 and 260 before connecting cable between beaconing ports 21 and 27. The management client 100 connects to the management controller 110, and a Fibre Channel cable 610 connects the first host 200 to the first data storage subsystem 250.

Each data storage subsystem can be as described in U.S. patent application Ser. No. 10/264,603, entitled, Systems and Methods of Multiple Access Paths to Single Ported Storage Devices, filed on Oct. 3, 2002 and U.S. patent application Ser. No. 10/677,560, entitled, Systems and Methods of Multiple Access Paths to Single Ported Storage Devices, filed on Oct. 1, 2003, which are incorporated herein by reference. They provide alternate access paths to continue data operations while the cabling connections and disconnection occur. It is understood, however, that other suitable storage device(s) or data storage subsystems can be used.

Each data storage subsystem has nodes 1 and 2 to avoid a single point of failure. For brevity, we discuss node 2 of each data storage subsystem, which is representative of node 1. Node 2 of the first data storage system 250 includes a first FC controller 630 coupled to port 24 and to a first port bypass circuit 650, which is coupled to ports 21, 22, and 23, and a first CPU 640 coupled to the first FC controller 630 and a first light controller 660 that controls lights 31, 32, 33, and 34. Node 2 of the second data storage subsystem 260 includes a second FC controller 680 coupled to a port 28 and to a second port bypass circuit 700, which in turn is coupled to ports 25, 26, and 27, and a second CPU 690 coupled to the second FC controller 680 and a second light controller 710 that controls lights 35, 36, 37, and 38.

These components are known. A suitable port bypass circuit is the Vitesse VSC7147 available from Vitesse Semiconductor Corporation, Camarillo, Calif. A suitable FC controller is the QLogic ISP2312 available from QLogic Corporation, Aliso Viejo, Calif. A suitable light controller for LEDs is the Phillips PCA9551 LED Driver device available from the Philips Semiconductors, Eindhoven, The Netherlands. The datasheet for each part is incorporated herein by reference.

To add the second data storage subsystem 260 to the first data storage subsystem 250, the user mounts the second data storage subsystem 260 in a rack (not shown) and turns on the power. In normal state, the first port bypass circuit 650 and second port bypass circuit 700 bypass certain ports not connected to a cable. This is represented by the "x" across the lines to the ports 21, 22, 25 and 26. The other ports are not bypassed for various reasons. Port 23 is not bypassed because it is the first port to be connected, e.g., to first host 200. Port 27 is not bypassed because it is to be connected. Finally, ports 24 and 28 are not bypassed because they are end point for cables that are connected to ports with port bypass circuits (not shown).

To guide the user to first port 21 and second port 27, the management controller 110 instructs the first light controller 660 to beacon the light 31 corresponding to the first port 21. The second data storage subsystem 260 beacons the light 37 corresponding to the second port 27 without being connected to the data storage system if the second data storage subsystem 260 is turned on, confirms normal operation, and does not sense a connection to the host 200 at port 27 (i.e., the default host connection).

Beaconing a port (i.e., beaconing the light corresponding to a port) can be implemented by a variety of techniques. For example, the light controller can turn the beaconing light on, turn the beaconing light off while others remain lit, flash the beaconing light, and/or change the color of the beaconing light that is closest to the port or matches the overall arrangement of the lights with respect to the ports.

Before, during, or after the beaconing of the ports, the management controller 110 sends a message to the management client 100 to display instructions to the user to connect the cable between the beaconing ports 21 and 27 or a message of similar nature. In an alternative embodiment, the displaying of instructions need not be dynamically displayed to the user as primarily described. The instructions can be displayed in paper manual, a CD, in a help screen, in a stand alone software application, in a video tape, DVD, or audio device (e.g., tape player) to the user.

In an embodiment, the user indicates by marking a checkbox 102 labeled "done" (e.g., FIG. 5) displayed at the management client 100 that the cable 612 is connected. In an alternative embodiment, the first data storage subsystem 250 detects the connection and sends a message to the management controller 110.

The management controller 110 optionally suspends all traffic on the loop, enables the first port 21, and one or more Fibre Channel devices initiate a LIP to identify all devices on the Fibre Channel loop. Enabling port 21 removes the port bypass on first port 21. The management controller 110 requests the identity of the device connected to first port 21 by examining the results of the LIP.

If the management controller 110 does not suspend traffic on the loop and a port bypass is enabled or disabled while there is active traffic on the loop, frame errors are likely to occur. The FC loop port state machine and the FC protocol have methods to detect these errors and implement effective recovery procedures, but this error handling degrades performance because command sequences on the loop at the time of the disruption are lost and the recovery path is through a high level protocol command time-out and command level retry.

There are several ways to suspend traffic on the loop to avoid these frame errors. The simplest is to instruct the first host 200 and all other command initiators on the loop to cease issuing new commands and then wait until all outstanding operations are complete. This has the advantage the loop can still be used for command functions. For instance, the order of operations could be changed to wait to send the beaconing command until after the suspend function completes. This would be appropriate when disconnecting or moving a cable.

Another way to suspend operations on a Fibre Channel loop is for a device to issue an arbitrate ordered set (ARB(x)) and wait until it wins arbitration then it can switch the state of the port bypass circuit without causing any disruption in loop traffic. In an embodiment, the management controller 110 would issue one command to the first CPU 640 which in turn would cause the first FC controller 630 to send the ARB(x) on the loop and after winning arbitration would enable the first port 21 with the new connected cable. Having switched the state of the port bypass circuit 650, the first FC controller 630 could stop sending its ARB(x). The sequence would continue with a LIP.

If node 1 of the second data storage subsystem 260 is connected to a host, the control to the light 37 corresponding to the port 27 of the second data storage subsystem 260 may be transmitted from Node 1 CPU 670 to the second CPU 690 across inter-node link 50.

In an embodiment the control of the beaconing lights may be done by general purpose I/O functions of the first CPU 640 and the second CPU 690, the first and second bypass circuits 650 and 700 or the first and second FC controllers 630 and 680.

Figure 5:
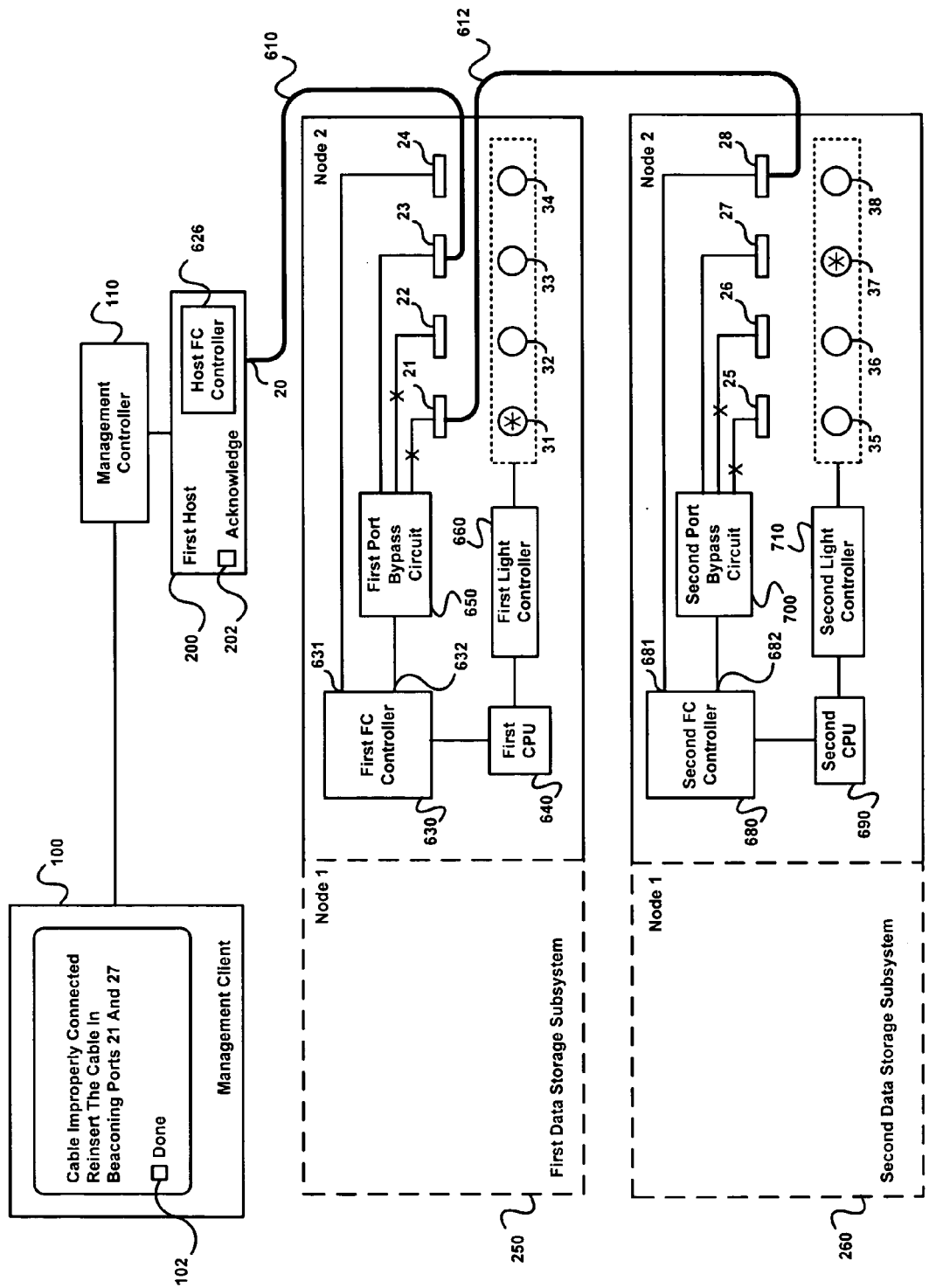
FIG. 5 illustrates the data storage subsystems after the user has improperly connected the cable in the second data storage subsystem.

FIG. 5 illustrates the data storage subsystems after the user has improperly connected the cable to the second data storage subsystem 260. Despite beaconing port 27, the user improperly connected cable 612 from port 21 to port 28. When examining the LIP results, the management controller 110 discovers the loop includes port 681 on the second FC controller 680 rather than the expected connection to port 682. The management controller 110 instructs the first data storage subsystem 250 to bypass port 21, redo the LIP, and resume traffic on the loop. The management client 100 displays that the cable 612 is improperly connected and needs to be reinserted in the beaconing ports 21 and 27.

Figure 6:
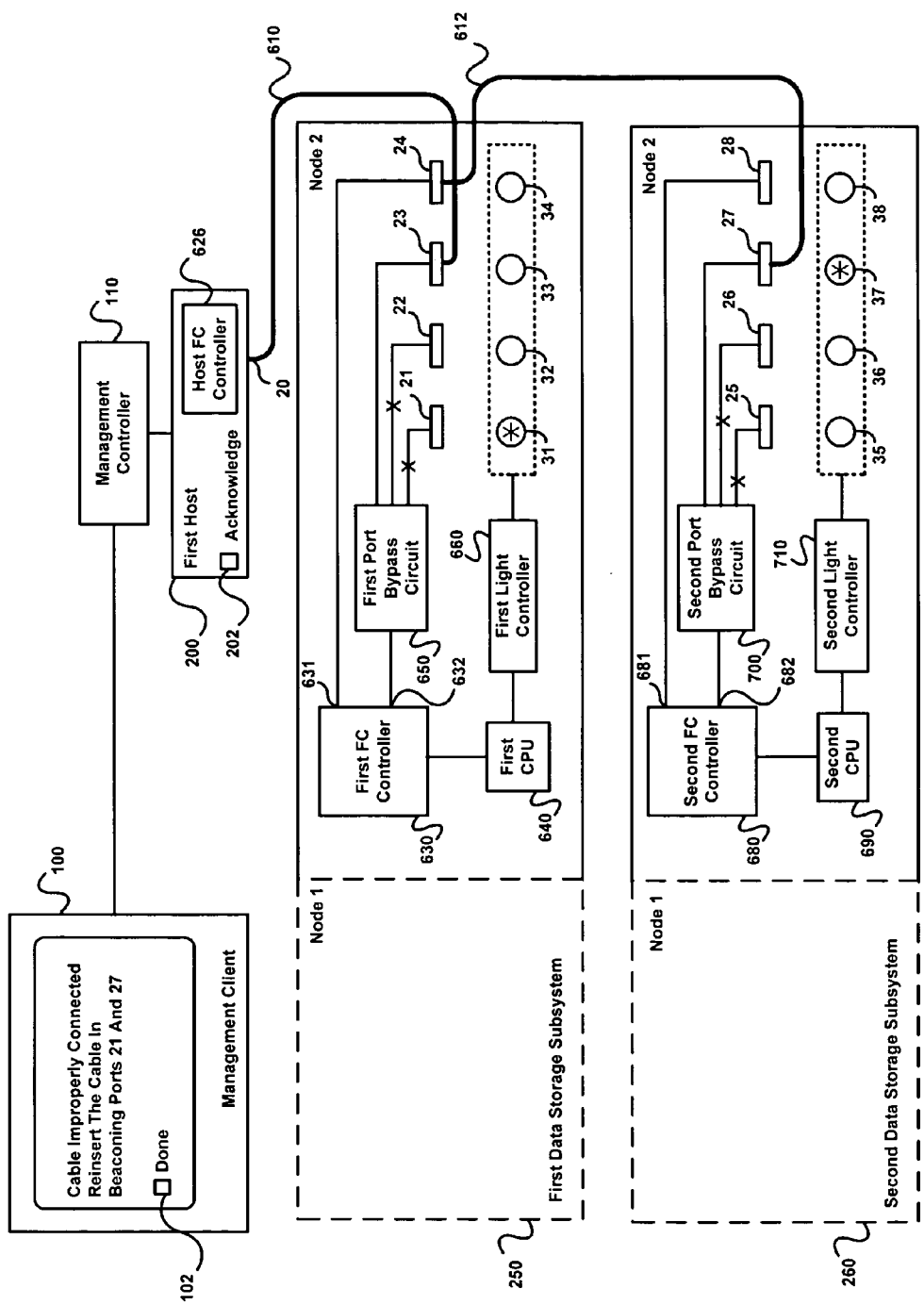
FIG. 6 illustrates the data storage subsystems after the user has improperly connected the cable in the first data storage subsystem.

FIG. 6 illustrates the data storage subsystems after the user has improperly connected the cable to the first data storage subsystem 250. Despite beaconing light 31, the user improperly connected cable 612 from port 24 to port 27. When examining the LIP results, the management controller 110 will not discover the second FC controller 680 on the loop which includes the host FC controller 626. The first CPU 640 communicating with the first FC controller 630 can discover the connection from port 631 to port 682 on the second FC controller 680. However, as before the management client 100 displays that the cable 612 is improperly connected and needs to be reinserted in the beaconing ports 21 and 27.

Figure 7:
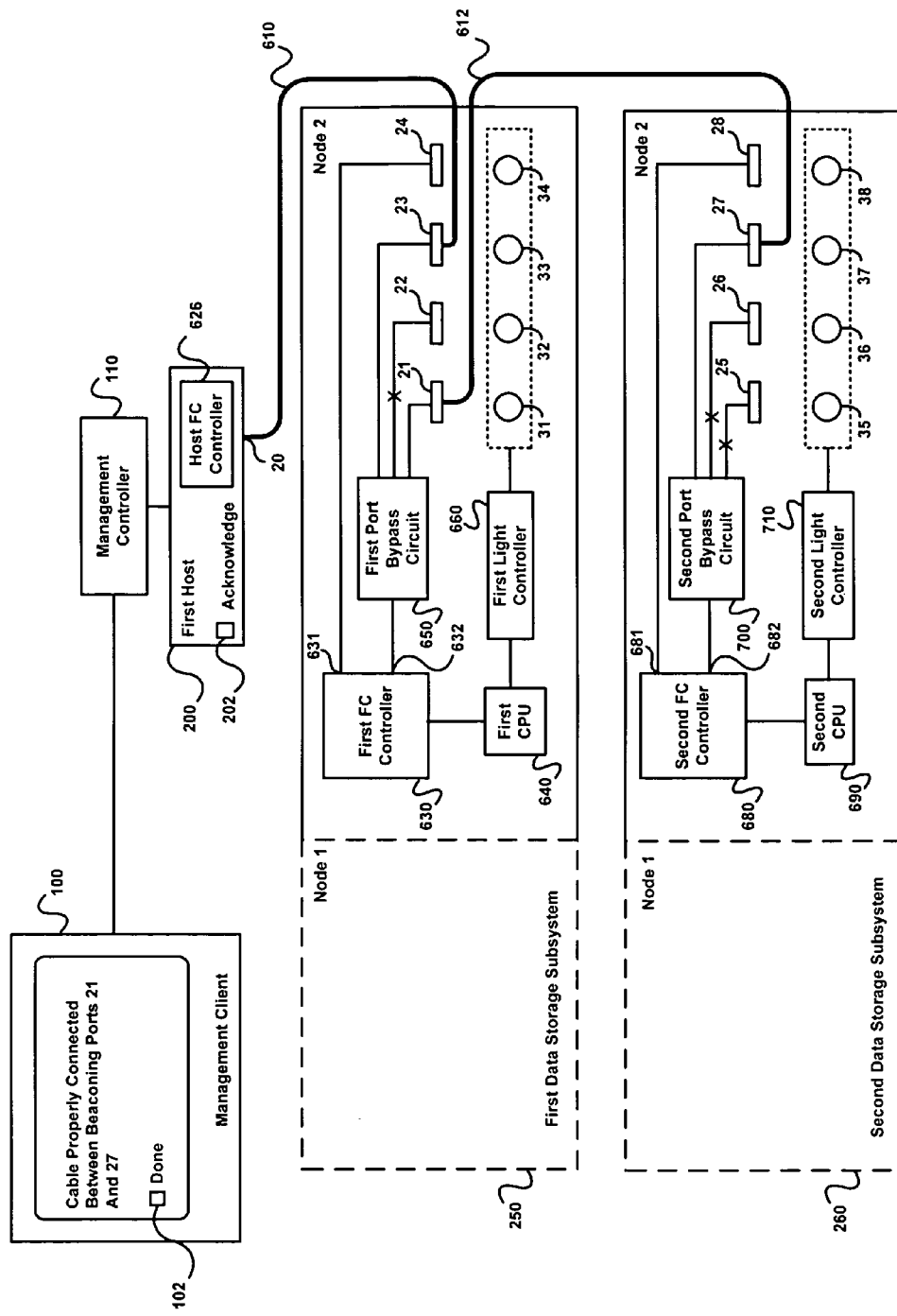
FIG. 7 illustrates the data storage subsystems after the user has properly connected the cable between the first and second data storage subsystems.

FIG. 7 illustrates the data storage subsystems after the user has properly connected the cable between the first and second data storage subsystems 250 and 260. After seeing the display of FIG. 5, the user removes cable 612 from port 28 and inserts cable 612 in port 27. The management controller 110 optionally suspends all traffic on the loop, enables port 21, and initiates a LIP to identify all devices on the Fibre Channel loop. The management controller 110 requests the identity of the device connected to port 21. Because the user has properly connected the cable 612 from port 21 to port 27, the management controller 110 resumes data traffic on the loop, displays that the cable 612 is properly connected between beaconing ports 21 and 27, and disables (e.g., turns off) the lights of the beaconing ports 21 and 27.

In FIG. 5, the incorrect connection to port 28 resulted in a valid but improperly connected loop. Other misconnections, e.g., to a bypassed port such as port 25, will not generate a closed loop. In the latter case, the LIP will time out and port 21 will be bypassed to clear the loop fault and the error will be reported as discussed earlier. A connection to a port that is not powered or a faulty cable connection can be detected by the signal detect feature of the first port bypass circuit 650 failing to sense valid FC signaling sequences. When this happens the bypass on port 21 will not be removed (i.e., the port is not enabled) and the user will be informed of the error.

Figure 8B:
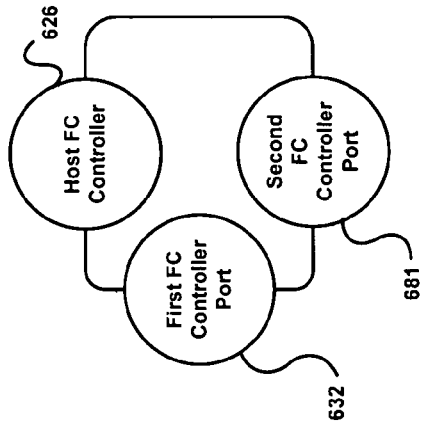
FIGS. 8A–8C illustrate cable connection and misconnection outcomes with loop connection diagrams.
Figure 8A:
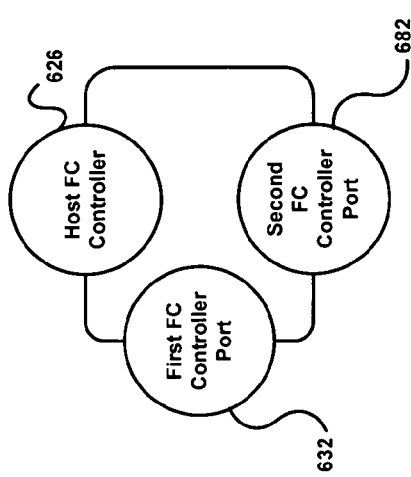
Figure 8C:
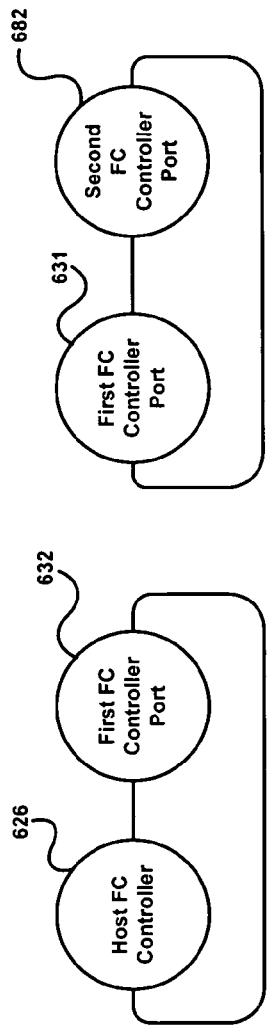

FIGS. 8A–8C are loop connection diagrams of cable connection and misconnection outcomes. The diagrams remove the details of physical entities such as cables and port bypass circuits and show the logic visible to the management controller 110 from the LIP results.

FIG. 8A shows controller nodes of the Fibre Channel loop when the cable is properly connected as shown in FIG. 7.

FIG. 8B shows controller nodes of the Fibre Channel loop as improperly connected in FIG. 5. If cable 612 connects ports 21 and 28, a different port of the second FC controller is included, that is, at port 681 rather than port 682. The first CPU 640 makes the information available to the management controller 110 and this situation would be corrected using the procedures discussed above.

FIG. 8C shows cable 612 improperly connecting ports 24 and 27 as shown in FIG. 6. The LIP result will show the host FC controller 626 and port 632 of the first FC controller on one independent loop. The misconnection also results in a second independent loop connecting ports 631 and 682.

Figure 9:
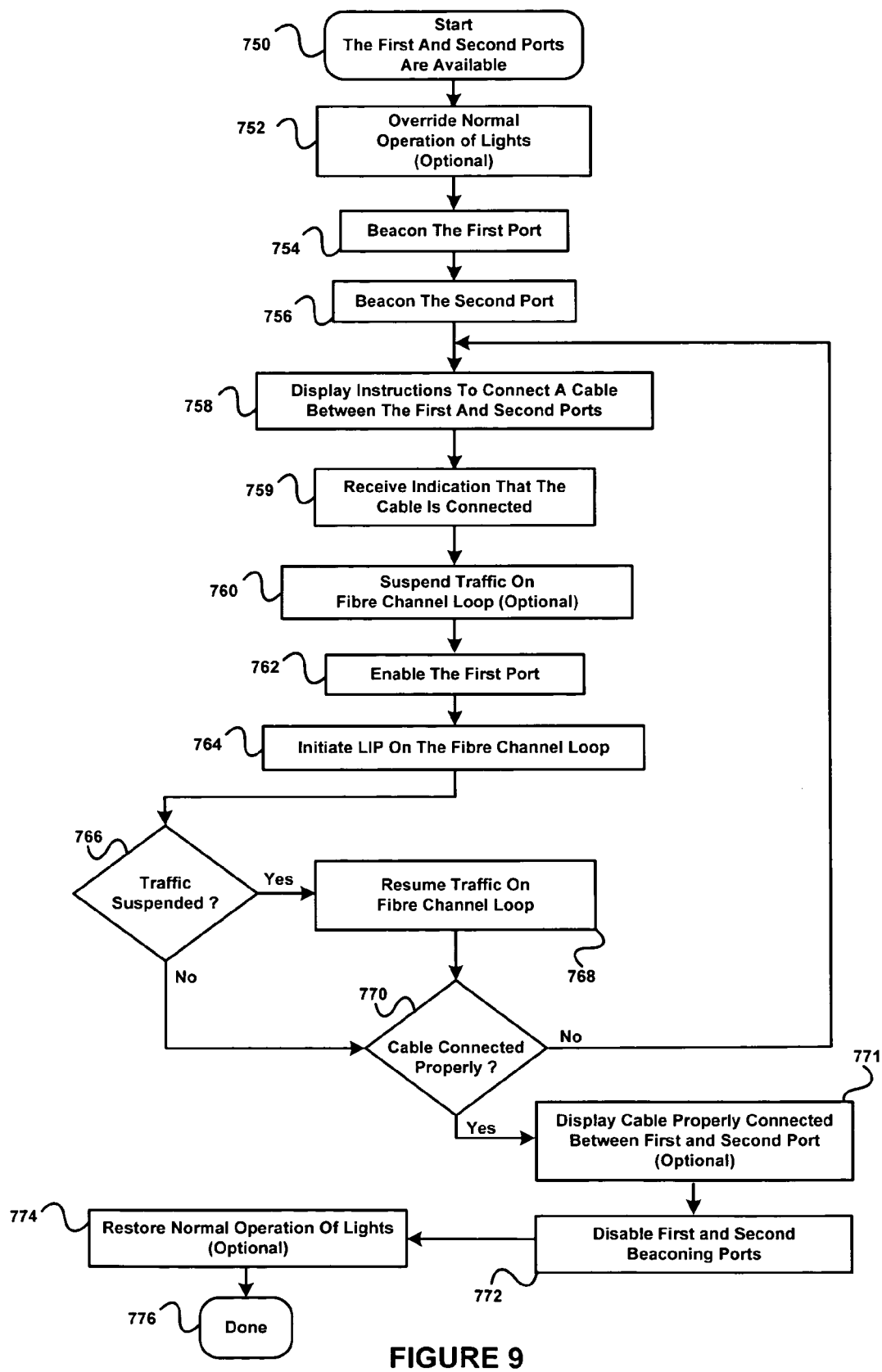
FIG. 9 is a flow diagram of steps performed by the management controller to add a cable between Fibre Channel devices.

FIG. 9 is a flow diagram of methods performed by the management controller 110 to connect a cable between Fibre Channel devices (e.g., host or data storage subsystem). At step 750, the method starts with the first and second ports available for cable connection. At step 752, the management controller 110 may override the normal operation of the lights, e.g., turn off the lights to make the lights being beaconed stand out. At steps 754 and 756, the management controller 110 beacons the lights corresponding to the first and second ports to indicate which ports to connect with the cable. At step 758, the management controller 110 displays instructions, for example, at the management client 100 to connect a cable between the first and second ports. In response to this, the user installs the cable. At step 759, the management controller 110 receives an indication that the cable is connected. In an embodiment, step 759 is implemented by the user marking a checkbox 102 labeled "done" at the management client 100 (FIG. 4). In another embodiment, the management controller 110 receives the indication by detecting automatically when the cable is connected to the first and second ports. In another embodiment, the management controller 110 receives the indication by a pushbutton 202 labeled "acknowledge" on host 200 (FIG. 4) or on a data storage subsystem (not shown). At step 760, the management controller 110 optionally suspends data traffic on the Fibre Channel loop. At step 762, the management controller 110 enables the first port. At step 764, one or more Fibre Channel devices initiate a LIP to identify all devices on the loop. At step 766, the management controller 110 determines if the management controller 110 suspended traffic at step 760.

If so, the traffic is resumed at step 768. Otherwise, the method skips step 768 and goes to step 770. At step 770, the management controller 110 verifies whether the cable is properly connected between the beaconing ports after reviewing the LIP results. If the management controller 110 fails to find a new Fibre Channel device, it determines that the cable is not properly connected. If the management controller determines that the cable is not connected to the first port and the second port at step 770, it repeats steps 758–770. If the management controller determines that the cable is properly connected the method continues to step 771. At step 771, the management controller 110 optionally sends a message to the management client 100 to display that the cable is properly connected between the first and second ports. At step 772, the management controller 110 disables (e.g., turns off) the lights of the first and second beaconing ports. At step 774, the lights of the data storage system are restored (e.g., turned on) to normal operations. At step 776, the method is done.

If the first port is on the host (e.g., port 20) or directly connected to the FC controllers (e.g., port 24 or 28) and no other command initiating entities are on the loop, the management controller 110 may not need to suspend traffic at step 760 before enabling the first port at step 762 or to enable a port bypass circuit.

In an embodiment, overriding or restoring the normal operation of the lights at step 752 or step 774, respectively, may affect all the lights on the hosts and data storage subsystems or only the lights of the Fibre Channel devices to be connected by the new cable.

In another embodiment, the host 200 or the first CPU 640 can execute one or more of the steps of the method of FIG. 9. Thus, the management controller 110 can delegate the steps of suspending traffic 760, enabling the first port 762 and initiating the LIP 764 by transmitting a single command to a first CPU 640 that controls the first port bypass circuit 650 corresponding to a first port such as one of ports 21–23. In an alternative embodiment, the first port can be located on the first host 200.

Figure 10:
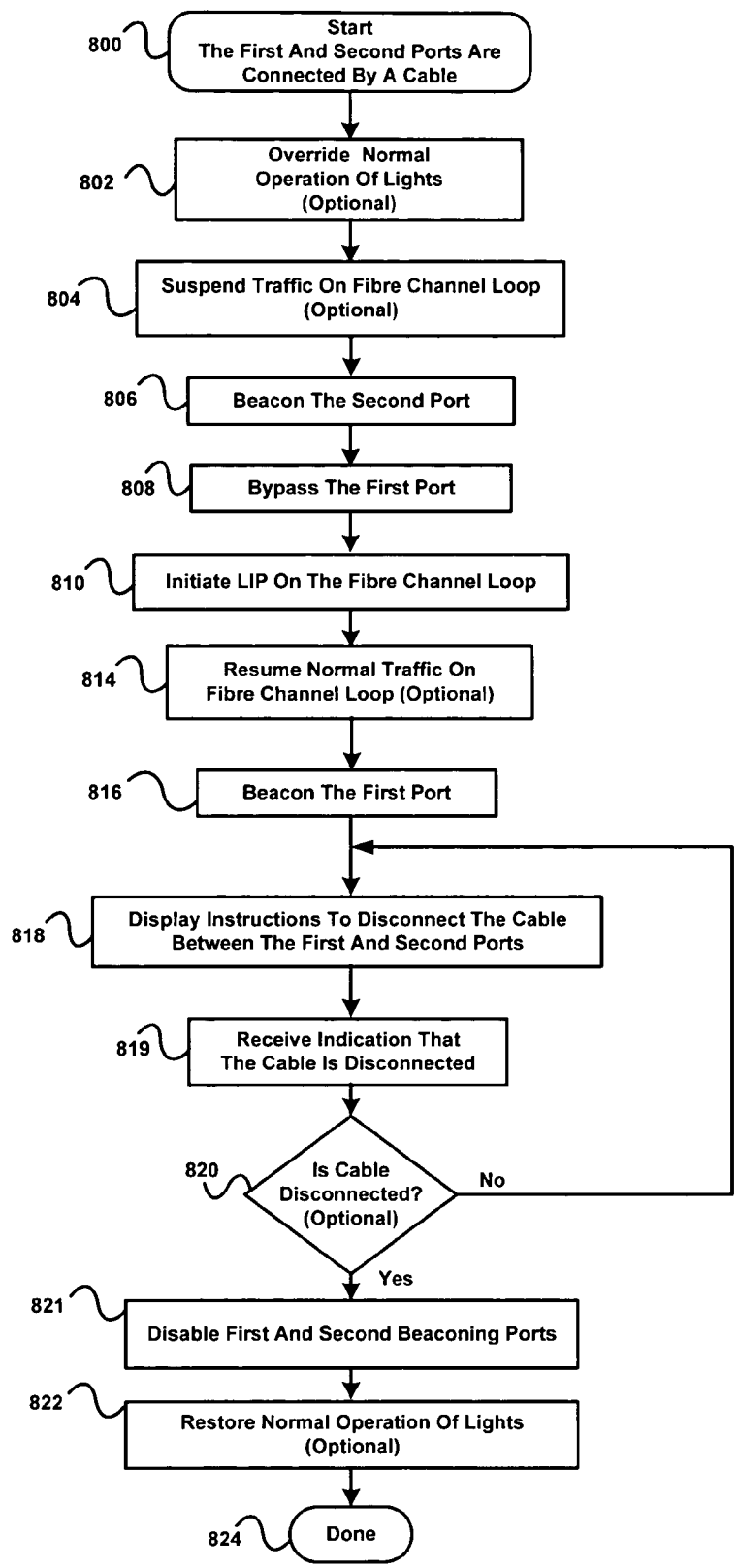
FIG. 10 is a flow diagram of steps performed by the management controller to remove a cable between Fibre Channel devices.

FIG. 10 is a flow diagram of methods performed by the management controller 110 to remove a cable between Fibre Channel devices (e.g., host or data storage subsystem). At step 800, the management controller 110 starts the method with a cable connected to the first port of a Fibre Channel device and a second port of another Fibre Channel device. At step 802, the management controller 110 may override the normal operation of the lights, e.g., turn off the lights to make the lights being beaconed stand out. At step 804, the management controller 110 optionally suspends data traffic on the loop to limit the number of commands that must be retried due to error. At step 806, the management controller 110 beacons the second port. This is done now because the cable to be removed may be the media of conveying this command. At step 808, the management controller 110 bypasses the first port. Bypassing the first port puts the loop in the logical configuration it has when the cable is disconnected. At step 810, the management controller 110 initiates a LIP on the Fibre Channel loop to identify all devices on the loop in this configuration. At step 814, the management controller 110 resumes normal traffic on the Fibre Channel loop if it was previously suspended in step 804. At step 816, the management controller 110 beacons the first port. At step 818, the management controller 110 displays instructions, e.g., on the management client 100 to disconnect the cable between the beaconing first and second ports. At step 819, the management controller 110 receives an indication that the cable is disconnected. At step 820, the management controller 110 determines if the cable is disconnected. In an embodiment, the management controller 110 may use the signal detect function of the port bypass circuit to detect the cable is disconnected. If the cable is not disconnected at step 820, the method repeats steps 818–820. If the cable is disconnected at step 820, the method goes to step 821. At step 821, the management controller 821 disables (e.g., turns off) the lights of the first and second beaconing ports. At step 822, the management controller 110 may restore normal operation of the lights. At step 824, the method is done.

In an embodiment with loop topologies involving multiple command initiators or hosts on a Fibre Channel loop, removing a cable as described in FIG. 10 may result in two functioning loops. In this embodiment, the management controller 110 takes the steps of bypassing the second port concurrent with step 808. A Fibre Channel controller on each of the loops will initiate independent LIPs and resume independent operations. Such a topology requires that the management controller 110 and hosts 200 and 230 and any command initiating devices connected to each of the loops reach all required devices.

In an embodiment, the management controller 110 includes a step of detecting automatically when the cable is disconnected from the first port and the second port step 819. In another embodiment, the management controller 110 performs step 819 by receiving user input indicating that the cable is disconnected between the first port and the second port by either marking a check box labeled "done" 102 on the management client 100 or a pushbutton labeled "acknowledge" 202 on the first host 200.

In an embodiment, the management controller 110 delays beaconing the second port at step 806 until the first port is beaconed at step 816. CPU 620 or CPU 670 and links 40 or 50, respectively, provide alternative command paths corresponding to the second port that do not depend on the cable that is being removed.

Figure 1:
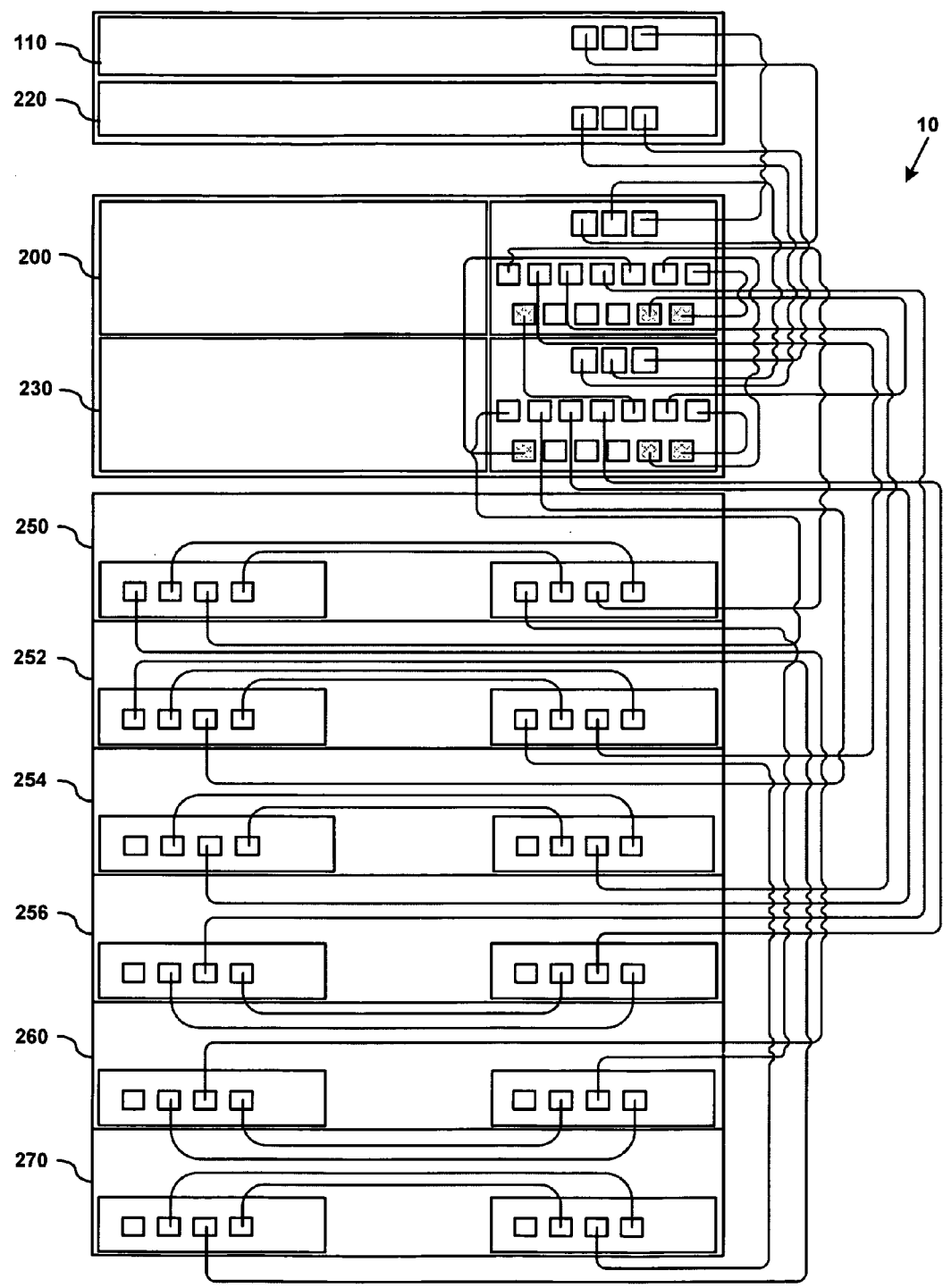
FIG. 1 illustrates the complexity of cabling associated with the hosts, the management controllers, and the data storage subsystems.

The methods of FIGS. 9 and 10 can be combined to permit moving a cable from one port to another while leaving the other end connected. The beaconing lights can be one color, e.g., green or blinking for removal and e.g., yellow or not blinking for addition. By a series of cable additions and cable removals as shown in FIGS. 9-10, a user can configure a data storage system with complicated cabling as shown in FIG. 1 without impacting operations.

What is claimed is:

1. A method of configuring a data storage system processing I/O requests and having active data traffic on a Fibre Channel loop including a first port to be connected to a second port, comprising:
   (a) beaconing the first port;
   (b) beaconing the second port;
   (c) displaying instructions to a user to connect a cable between the first port and the second port;
   (d) receiving an indication that the cable is connected between the first port and the second port;
   (e) enabling the first port;
   (f) initiating a LIP on the Fibre Channel loop;
   (g) verifying whether the cable is connected between the first port and the second port; and
   (h) suspending the active data traffic on the Fibre Channel loop before step (e) and resuming the active data traffic on the Fibre Channel loop after step (f).

2. The method of claim 1, wherein the beaconing in steps (a) and (b) includes turning on a first light corresponding to the first port and a second light corresponding to the second port.

3. The method of claim 1, wherein the beaconing in steps (a) and (b) includes changing the color of a first light corresponding to the first port and a second light corresponding to the second port.

4. The method of claim 1, wherein before the beaconing in steps (a) and (b), performing a step of turning off all lights of the data storage system.

5. The method of claim 1, wherein the displaying in step (c) is on a management client.

6. The method of claim 1, wherein the receiving in step (d) includes automatically detecting the cable is connected between the first port and the second port.

7. The method of claim 1, wherein the receiving in step (d) includes receiving user input indicating the cable is connected between the first port and the second port.

8. The method of claim 1, wherein the verifying in step (g) is by determining the identity for the second port during the LIP.

9. The method of claim 1, further comprising step (g) determining that the cable is not connected between the first port and the second port, wherein the method repeats steps (a) through (g).

10. The method of claim 1, wherein the first part is located on a node of a first data storage subsystem and wherein the second port is located on a node of a second data storage subsystem.

11. The method of claim 1, wherein the first port is located on a node of a first host and wherein the second port is located on a node of a first data storage subsystem.

12. The method of claim 1, wherein the first port is located on a node of a first host and wherein the second port is located on a node of a second host.

13. The method of claim 1, wherein the second port beaconing occurs after a Fibre Channel device having the second port is turned on, confirms normal operation and does not sense a connection at the second port.

14. A method of configuring a data storage system processing I/O requests and having active data traffic on a Fibre Channel loop including a cable connecting a first port to a second port, comprising:
   (a) beaconing the second port;
   (b) bypassing the first port;
   (c) initiating a LIP on the Fibre Channel loop having the bypassed first port;
   (d) beaconing the first port;
   (e) displaying instructions for disconnecting the cable between the first port and the second port;
   (f) receiving an indication that the cable is disconnected; and
   (g) suspending the active data traffic on the Fibre Channel loop before step (b) and resuming the active data traffic on the Fibre Channel loop after step (c).

15. The method of claim 14, wherein the beaconing in steps (a) and (d) includes turning on a first light corresponding to the first port and a second light corresponding to the second port.

16. The method of claim 14, wherein the beaconing in steps (a) and (d) includes changing the color of a first light corresponding to the first port and a second light corresponding to the second port.

17. The method of claim 14, wherein before the beaconing in steps (a) and (d), performing a step of turning off all lights of the data storage system.

18. The method of claim 14, wherein the displaying in step (e) is on a management client.

19. The method of claim 14, wherein the receiving in step (f) includes automatically detecting the cable is disconnected between the first port and the second port.

20. The method of claim 14, wherein the receiving in step (f) includes receiving user input indicating that the cable is disconnected between the first port and the second port.

21. The method of claim 14, wherein the first port is located on a node of a first data storage subsystem and wherein the second port is located on a node of a second data storage subsystem.

22. The method of claim 14, wherein the first port is located on a node of a first host and wherein the second port is located on a node of a first data storage subsystem.

23. The method of claim 14, wherein the first port is located on a node of a first host and wherein the second port is located on a node of a second host.

24. A system for processing I/O requests and adding a second Fibre Channel Device with a second port to a Fibre Channel loop having active data traffic and having a first Fibre Channel Device with a first port, comprising:
   means for displaying instructions to connect the second Fibre Channel device on the Fibre Channel loop having the active data traffic; and
   a management controller programmed for beaconing the first and second ports, displaying instructions to connect a cable between the first and second ports, receiving an indication that the cable is connected, suspending the active data traffic on the Fibre Channel loop, enabling the first port, initiating a LIP on the Fibre Channel loop, resuming the active data traffic on the Fibre Channel loop, and verifying whether a cable is connected properly between the first and second Fibre Channel devices.

25. The system of claim 24, wherein the first Fibre Channel device is a first host and the second Fibre Channel device is a second host.

26. The system of claim 24, wherein the first Fibre Channel device is a first host and the second Fibre Channel device is a first data storage subsystem.

27. The system of claim 24, wherein the first Fibre Channel device is a first data storage subsystem and the second Fibre Channel device is a second data storage subsystem.

28. A system for processing I/O requests and removing a second Fibre Channel Device with a second port from a Fibre Channel loop having active data traffic and a first Fibre Channel Device with a first port, comprising:
   means for displaying instructions to remove the second Fibre Channel device from the Fibre Channel loop having the active data traffic; and
   a management controller programmed for suspending the active data traffic on the Fibre Channel loop, beaconing the second port, bypassing the first port, initiating a LIP on the Fibre Channel loop having the suspended active data traffic, resuming the active data traffic on the Fibre Channel loop, beaconing the first port, displaying instructions to disconnect a cable between the first and second ports, receiving an indication that the cable is disconnected, and verifying whether the cable is disconnected from the first and second ports.

29. The system of claim 28, wherein the management controller is further programmed for overriding and restoring normal operation of the lights.

30. The system of claim 28, wherein the first Fibre Channel device is a first host and the second Fibre Channel device is a second host.

31. The system of claim 28, wherein the first Fibre Channel device is a first host and the second Fibre Channel device is a first data storage subsystem.

32. The system of claim 28, wherein the first Fibre Channel device is a first data storage subsystem and the second Fibre Channel device is a second data storage subsystem.

33. The method of claim 13, wherein the Fibre Channel device is a host.

34. The method of claim 13, wherein the Fibre Channel device is a data storage subsystem.

* * * * *